(12) United States Patent
Tung et al.

(10) Patent No.: US 8,332,183 B2
(45) Date of Patent: Dec. 11, 2012

(54) DETECTION AND ANALYSIS APPARATUS FOR MEMBRANE FILTRATION PROCESS

(75) Inventors: Kuo-Lun Tung, Taoyuan County (TW);
Yu-Ling Li, Taoyuan County (TW);
Nien-Jung Lin, Taoyuan County (TW);
Shih-Chieh Lai, Taoyuan County (TW);
Yi-Hsun Huang, Taoyuan County (TW)

(73) Assignee: Chung Yuan Christian University, Tao-Yuan (TW)

( * ) Notice: Subject to any disclaimer, the term of this patent is extended or adjusted under 35 U.S.C. 154(b) by 412 days.

(21) Appl. No.: 12/718,117

(22) Filed: Mar. 5, 2010

(65) Prior Publication Data

US 2011/0184696 A1 Jul. 28, 2011

(30) Foreign Application Priority Data

Jan. 28, 2010 (TW) ................ 99102363 A (51) Int. Cl.
*G01B 11/06* (2006.01)
(52) U.S. Cl. ..................... 702/172; 356/630
(58) Field of Classification Search .......... 702/170–172, 702/166; 356/630, 429
See application file for complete search history.

(56) References Cited

FOREIGN PATENT DOCUMENTS
GB  2017916 A  *  4/1979
TW     527205     4/2003

OTHER PUBLICATIONS

Tung, Kuo-Lun et al., "In Situ Measurement of Cake Thickness Distribution by a Photointerrupt Sensor" Journal of Membrane Science, Mar. 9, 2001, pp. 57-67.*
Kuo-Lun Tung; Monitoring Technique for Water Treatment Membrane Processes; Monitoring and Visualizing Membrane-Based Processes; Mar. 2009; p. 331-357; Wiley-VCH Verlag GmbH & Co. KGaA, Weinheim; John Wiley & Sons, Inc.,; Hoboken, NJ.
Kuo-Lun Tung, Sherjing Wang, Wei-Ming Lu, Chun-Hsi Pan; In situ measurement of cake thickness distribution by a photointerrupt sensor; Elsevier, Journal of Membrane Science; Mar. 9 2001; p. 57-67; www.elsevier.nl/locate/memsci.

* cited by examiner

*Primary Examiner* — Manuel L Barbee
(74) *Attorney, Agent, or Firm* — WPAT PC; Justin King (57) ABSTRACT

The present invention discloses a detection and analysis apparatus, comprising a photo sensing device, comprising a plurality of sensing elements linearly arranged to form a first array, for detecting a signal of the thickness change of the cake at a linear position of the filter medium; a driving device, for driving the photo sensing device to move relatively parallel to the filter medium on the top of the cake so that the photo sensing device detects the thickness change of the cake on at least one local plane of the filter medium; and a data processing device, coupling to the photo sensing device, for continuously processing and analyzing the signal detected by the photo sensing device to thereby in-situ estimate the thickness change of the cake on the at least one local plane of the filter medium during the filtration process.

18 Claims, 7 Drawing Sheets

DETECTION AND ANALYSIS APPARATUS FOR MEMBRANE FILTRATION PROCESS

BACKGROUND OF THE INVENTION

1. Field of the Invention

The present invention is generally related to a measurement apparatus for the thickness of a cake growing in a filtration system, and more particularly to an apparatus for in-situ measuring the thickness of a grown cake by utilizing a photo sensing device together with a driving device to incorporate in a filtration system.

2. Description of the Prior Art

In a filtration process, as the solid content in a slurry has a diameter larger than the pore diameter of a filter medium, after the filtration cycle proceeds several times, a cake gradually forms on the surface of the filter medium and the thickness of the cake increases with increase in time. As the thickness of the cake is thicker, the obstruction in filtering the slurry becomes larger and thus the filtration rate becomes slower. Thus, the cake on the filter medium should be removed. However, usually the cake is hard to be completely removed and leaves a portion on the filter medium. If the above filter medium is continued to be used in the filtration process, the difference in the thickness distribution of the formed cake becomes larger and larger to cause the flow of the slurry unstable while the physical properties of the cake, such as the viscosity and the porosity of the cake, also become more uneven. Therefore, if the thickness distribution of the cake can be measured in time, the physical properties of the cake can be realized. That is, a reverse cleaning process can be taken place while the thickness of the cake is measured to reach a certain value so as to increase the filtration efficiency. In the fields like exhaust gas filtration, slurry filtration, or precision ceramics, the method for measuring the thickness distribution of the cake is a very important issue.

Currently, the technology in measuring the thickness of a cake is roughly divided into two categories: (1) a destructive measurement method: taking out the cake from the filter medium, shaping the cake to prepare for being easily measured, that is, a method destroying the original structure of the cake and incapable of in-situ measuring the thickness of the cake during the filtration process; and (2) a non-destructive measurement method: directly measuring the thickness of the cake formed during the filtration process without interfering the formation of the cake and destroying the structure of the cake, that is, a method measuring the real thickness of the cake during the filtration process.

The destructive measurement comprises methods like a drying and weighting method, a frozen section method, a cake reconstructing method, and so forth. Some report disclosed that a few points on the cake are chosen to analyze the protein content in the cake formed by cells to estimate the number of cells per unit volume of the cake and the shape of the cell and the porosity are predetermined so as to calculate the thickness of the cake. A microscope is used to scan yeast and cells to verify this measurement method but the report did not show the comparison result. This method is very complicate and very easy to create errors (Riesmeier, B., K. H. Kroner, and M. R. Kula, Studies on secondary layer formation and its characterization during cross-flow filtration of microbial cells, J. Membr. Sci., Vol. 34, pp. 245, 1987). The report about frozen section is to freeze the cake and then observe the thickness and the porosity of the cake by a microscope (Schmidt, E. and F. Loffeler, Preparation of dust cakes for microscopic examination, Powder Technol., Vol. 60, pp. 173, 1990). Additionally, a destructive method for measuring the thickness and the porosity of the cake is disclosed where the solid content of the cake formed on the tubular filter medium is taken out, the surface filtration method (filtration under constant pressure) under the same operating conditions is used to reconstruct the cake, and the thickness is measured as the thickness of the cake in the tubular filter medium (Vyas, H. K., A. J. Mawson, R. J. Bennett, A. D. Marshall, A new method for estimating cake height and porosity during cross flow filtration of particulate suspensions, J. Membr. Sci. Vol. 176, pp. 113-119, 2000).

Various non-destructive measurement methods have also been developed currently. Mostly light or sound waves are used and then the physical properties of the cake are determined by the intensity of their reflective waves. For example, U.S. Pat. No. 3,748,263 in 1973 disclosed a method of measuring the thickness of a cake on a filter element of a settling tank filter where the filter pads are vertically arranged and the slurry fed to the filter is divided into the cake and the filtrate. The cake is formed on the surface of the filter pad and the filtrate flows through a branched off stream and is collected by the collecting tank. When the cake has grown to its intended maximum thickness, it closes the passage means through the filter body while a filter layer settles on the filter body and filters the slurry of the branched off stream, the thus obtained filtrate being visible through a sight glass or the like and thus indicating that the filter cakes in the settling tank filter have reached their admissible maximum thickness.

U.S. Pat. No. 3,815,745 in 1974 disclosed a device for evaluating the quality of cake in intermittent filters. The device measures the thickness of a cake, washing degree, and drying degree by introducing a filtrate, washing liquid, and dried gas to the filter through a manifold where a sensing element is provided between the manifold and the inlet of the filter and the other sensing element is provided in the filter so that the signal difference of the two sensing elements are used to measure the thickness of the cake. The similar method is also applied to measure the washing degree and drying degree. Thus, the thickness of a cake, the washing degree, and the drying degree can be controlled.

Moreover, U.S. Pat. No. 4,548,080 in 1985 disclosed an apparatus to simulate fluid dynamics during drilling a well. The apparatus comprises a probing element having an ultrasonic device to generate and receive ultrasonic waves. The pole-like probing element is around and spaced from the porous cylindrical sleeve by a distance. The cake from the slurry mud is formed on the inside of the porous cylindrical sleeve. The ultrasonic device generates an ultrasound signal radially outwardly from the probing element and then the signal is reflected back by the cake on the porous cylindrical sleeve. The length of time taken for the echo to be picked up by the receiver can be used to determine the thickness of the cake. Thus, the flow rate flowing through the cake can be maintained.

It is reported that a method of measuring the height distribution on the surface of a filter cake by using a fringe-type light projector to moves light beams on the filter cake, incorporating with a CCD digital camera to record the angle difference of the intersection point between the filter medium and the surface of the filter cake with respect to the light projector, and calculating and showing its 3D images (Dittler, A., B. Gutmann, R. Lichtenberger, H. Weber and G. Kasper, Optical in situ measurement of dust cake thickness distributions on rigid filter media for gas cleaning, Powder Technology, Vol. 99, pp, 177-184, 1998).

Furthermore, a measurement method is disclosed by Hutchins D. A. and H. D. Mair, Ultrasonic monitoring of slip, cast ceramics, J. Materials science Letters, Vol. 8, pp. 1185, 1989. The time between the ultrasound generated and reflected is used to measure the thickness of the cake formed during the precision ceramic process. But, the method interferes the formation of the cake or destroys the structure of the cake.

The destructive measurement method cannot in-situ acquire the thickness of the cake during the filtration process and thus cannot immediately make adjustment. Besides, the original structure of the cake is changed during drying, freezing, reconstructing the cake. On the other hand, the above mentioned non-destructive measurement method for measuring the filter cake thickness has problems, such as requiring expensive equipments, complicated conversion after measurement, time consuming, generating experimental or calculation errors, and destroying the formation of the cake or the structure of the cake due to the radiation on the cake.

SUMMARY OF THE INVENTION

In accordance with the present invention, in order to fulfill the industrial requirements, the invention provides a detection and analysis apparatus for a membrane filtration process.

One object of the present invention is to provide a detection and analysis apparatus for measuring the thickness of a cake formed during the membrane filtration process in real time without destroying the structure of the cake.

Another object of the present invention is to provide a detection and analysis apparatus by the optical in-situ measurement technique to achieve the purposes of lowering cost, easy installation, and high accuracy.

Accordingly, the present invention discloses a detection and analysis apparatus for a membrane filtration process, used in a filtration system. The filtration system comprises a filtering device, a filter medium, and a target fluid. The filtering device executes a filtration process and the filter medium possesses a thickness change of the cake formed thereon. The apparatus comprises: a photo sensing device, comprising a plurality of sensing elements linearly arranged to form a first array, for detecting a signal of the thickness change of the cake at a linear position of the filter medium; a driving device, for driving the photo sensing device to move relatively parallel to the filter medium on the top of the cake so that the photo sensing device detects the thickness change of the cake on at least one local plane of the filter medium; and a data processing device, coupling to the photo sensing device, for continuously processing and analyzing the signal detected by the photo sensing device to thereby in-situ estimate the thickness change of the cake on the at least one local plane of the filter medium during the filtration process.

The present invention discloses a detection and analysis apparatus for a membrane filtration process, used in a membrane bioreactor. The membrane bioreactor comprises a plurality of filtering plates parallel to each other and a target fluid where each filtering plate is wrapped with a filtration membrane, the membrane bioreactor executes a filtration process, and each filtration membrane possesses a thickness change of the cake formed thereon. The apparatus comprises: a photo sensing device, comprising a plurality of sensing elements linearly arranged to form a first array, for detecting a signal of the thickness change of the cake on the filtration membrane; a driving device, for driving the photo sensing device to move relatively parallel to the filtration membrane on the top of the cake and driving the photo sensing device to move among the parallel filtering plates; and a data processing device, coupling to the photo sensing device, for continuously processing and analyzing the signal detected by the photo sensing device to thereby in-situ estimate the thickness change of the cake on the entire plane of the filtration membrane of at least one filtering plate during the filtration process.

DESCRIPTION OF THE PREFERRED EMBODIMENTS

What is probed into the invention is a detection and analysis apparatus for a membrane filtration process. Detail descriptions of the steps and compositions will be provided in the following in order to make the invention thoroughly understood. Obviously, the application of the invention is not confined to specific details familiar to those who are skilled in the art. On the other hand, the common steps and compositions that are known to everyone are not described in details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

Figure 1:
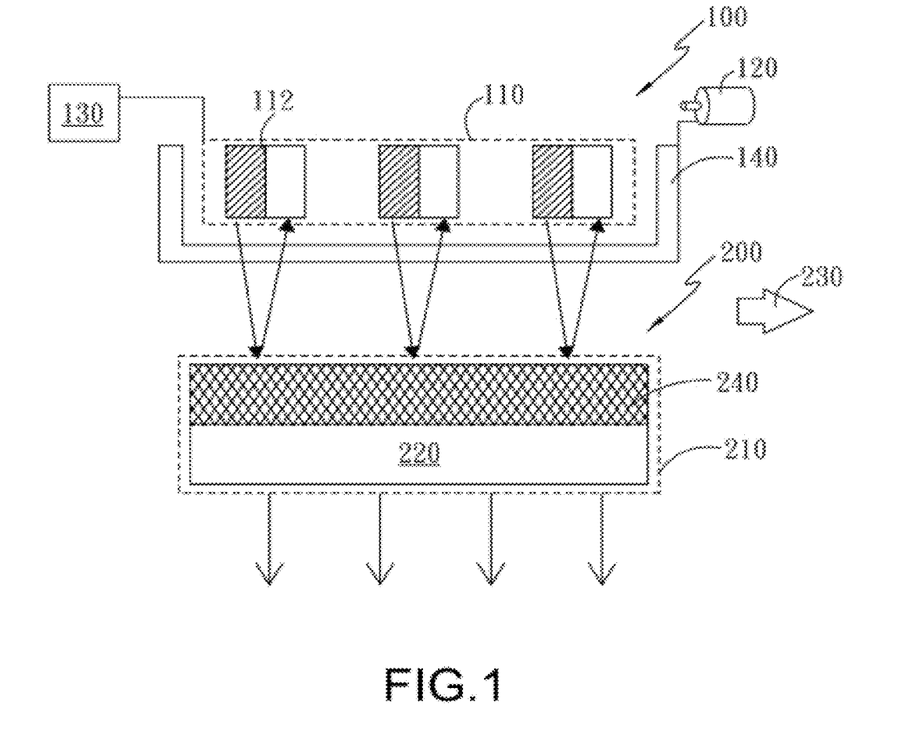
FIG. 1 shows a schematic diagram illustrating a detection and analysis apparatus for a membrane filtration process according to the first embodiment of the present invention.

Referring to FIG. 1, a first embodiment of the present invention discloses a detection and analysis apparatus 100 for a membrane filtration process, used in a filtration system 200. The filtration system 200 can be a cross-flow filtration system or a submerged membrane bioreactor (SMBR). The filtration system 200 comprises a filtering device 210, a filter medium 220, and a target fluid 230. The filtering device 210 executes a filtration process and the filter medium 220 possesses a thickness change of the cake 240 formed thereon.

The above detection and analysis apparatus 100 comprises a photo sensing device 110, a driving device 120, and a data processing device 130. The photo sensing device 110 comprises a plurality of sensing elements 112 linearly arranged to form a first array. The photo sensing device 110 is to detect a signal of the thickness change of the cake 240 at a linear position of the filter medium 220 and the measurement distance between the photo sensing device 110 and the filter medium 220 is smaller than or equal to 5 mm. The driving device 120 is used to drive the photo sensing device 110 to move relatively parallel to the filter medium 220 on the top of the cake 240 so that the photo sensing device 110 detects the thickness change of the cake 240 on at least one local plane of the filter medium 220. The driving device 120 further comprises a stepping motor. The data processing device 130 couples to the photo sensing device 110 and is used to continuously process and analyze the signal detected by the photo sensing device 110 to thereby in-situ estimate the thickness change of the cake 240 on the at least one local plane of the filter medium 220 during the filtration process. The target fluid 230 is selected from the group consisting of the following: polymethyl methacrylate (PMMA), calcium carbonate ($CaCO_3$), and Saccharomyces cerevisiae. The photo sensing device 110 uses a digital/analog converter (AD/DA converter) to convert the signal into the data to be analyzed by the data processing device.

Figure 2:
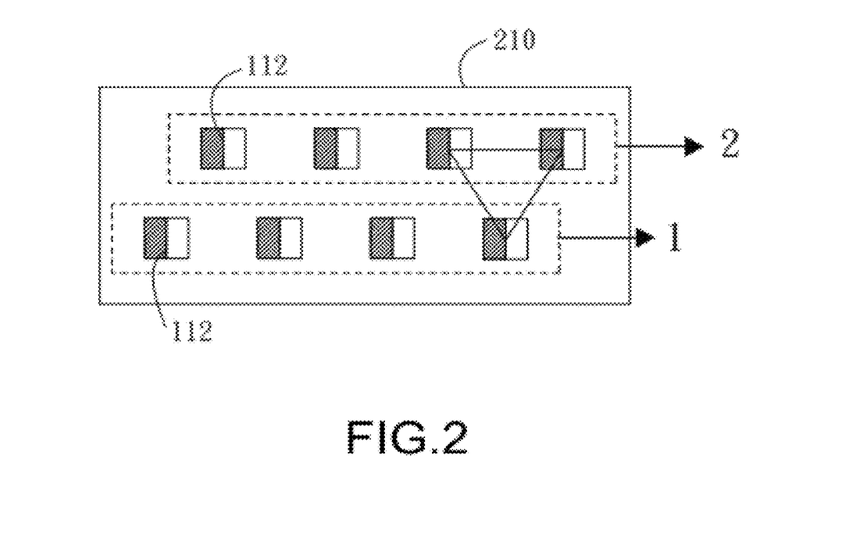
FIG. 2 shows a schematic diagram illustrating a photo sensing device according to the first embodiment of the present invention.

As shown in FIG. 2, according to one example of this embodiment, the photo sensing device 110 further comprises at least one second array 2. The second array 2 is formed by a plurality of sensing elements 112 linearly arranged and the spacing between the sensing elements 112 in the photo sensing device 110 is larger than or equal to 30 mm. Preferably, the first array and the second array are parallel to each other, the sensing elements 112 in the first array and the sensing elements 112 in the second array are arranged staggered, and the spacing between the sensing elements 112 in the photo sensing device 110 is larger than or equal to 30 mm.

Figure 3:
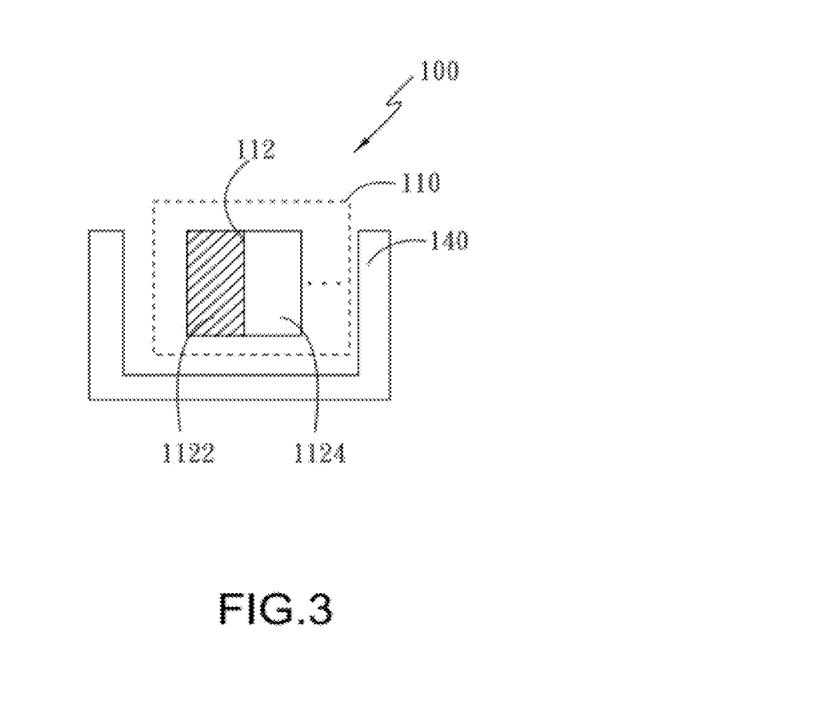
FIG. 3 shows a schematic diagram illustrating a photo sensing device provided with a protection device according to the first embodiment of the present invention.

As shown in FIG. 3, the detection and analysis apparatus 100 further comprises a protection device 140 made of PMMA covering the photo sensing device 110 to prevent the sensing elements 112 from being directly contacted with and corroded by the target fluid 230. The sensing element 112 comprises a light emitting unit 1122 and a light receiving unit 1124. The light emitting unit 1122 emits a light ray and then the light ray contacts the cake 240 and is reflected to generate a reflective ray to be received by the light receiving unit 1124. In one example, the light emitting unit 1122 is a light emitting diode (LED) while the light receiving unit 1124 is a phototransistor. The above light ray is infrared.

Figure 4:
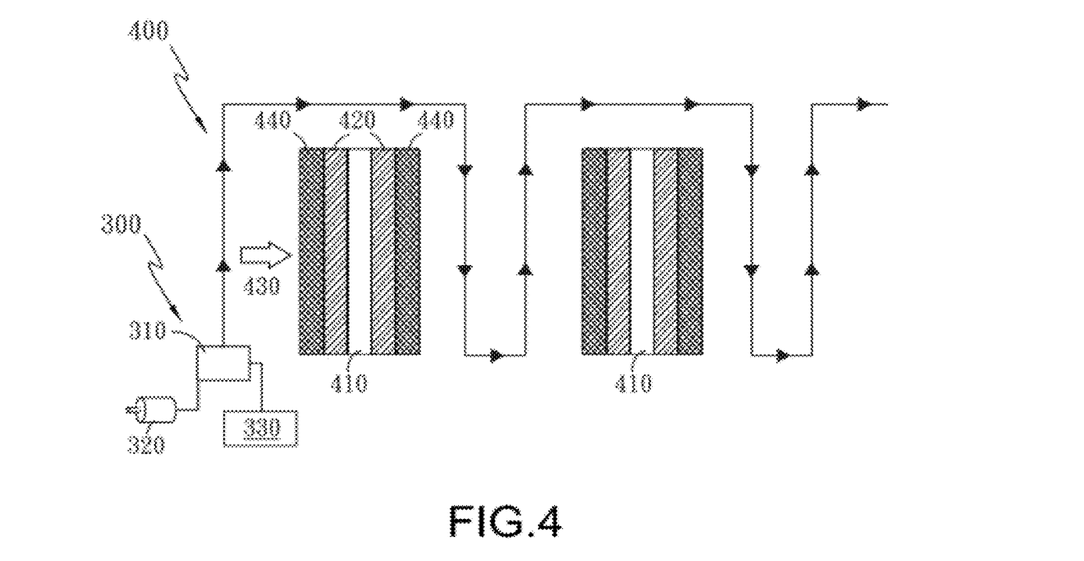
FIG. 4 shows a schematic diagram illustrating a detection and analysis apparatus for a membrane filtration process, used in a membrane bioreactor, according to the second embodiment of the present invention.
Figure 5:
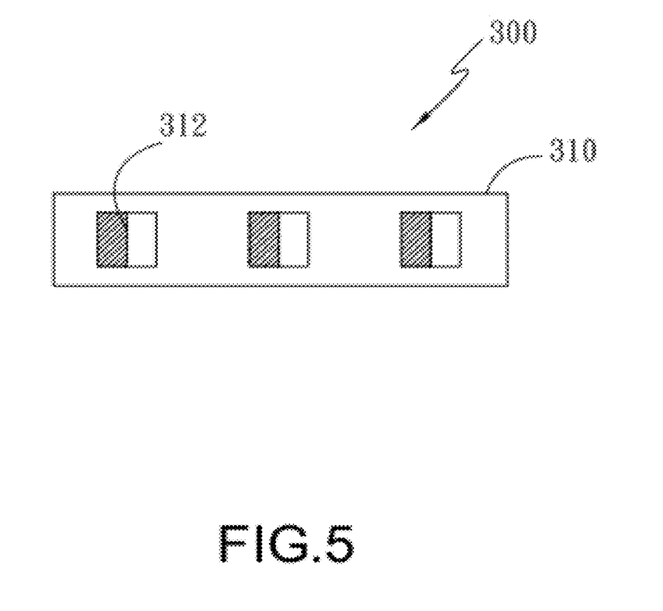
FIG. 5 shows a schematic diagram illustrating a photo sensing device according to the second embodiment of the present invention.

As shown in FIG. 4, a second embodiment of the present invention discloses a detection and analysis apparatus 300 for a membrane filtration process, used in a membrane bioreactor 400. The membrane bioreactor 400 comprises a plurality of filtering plates 410 parallel to each other and a target fluid 430. Each filtering plate 410 is wrapped with a filtration membrane 420. The membrane bioreactor 400 executes a filtration process and each filtration membrane 420 possesses a thickness change of the cake 440 formed thereon. In addition, the detection and analysis apparatus 300 comprises a photo sensing device 310, a driving device 320, and a data processing device 330. As shown in FIG. 5, the photo sensing device 310 comprises a plurality of sensing elements 312 linearly arranged to form a first array. The photo sensing device 310 is to detect a signal of the thickness change of the cake 440 on the filtration membrane 420 and the measurement distance between the photo sensing device 310 and the filtration membrane 420 is smaller than or equal to 5 mm. The driving device 320 is used to drive the photo sensing device 310 to move relatively parallel to the filtration membrane 420 on the top of the cake 440 and to drive the photo sensing device 310 to move among the parallel filtering plates 410. The driving device 320 further comprises a stepping motor.

The data processing device 330 couples to the photo sensing device 310 and is used to continuously process and analyze the signal detected by the photo sensing device 310 to thereby in-situ estimate the thickness change of the cake 440 on the entire plane of the filtration membrane 420 of at least one filtering plate 410 during the filtration process. The target fluid 430 is selected from the group consisting of the following: polymethyl methacrylate (PMMA), calcium carbonate ($CaCO_3$), and Saccharomyces cerevisiae. The photo sensing device 310 uses a digital/analog converter (AD/DA converter) to convert the signal into the data to be analyzed by the data processing device.

Figure 6:
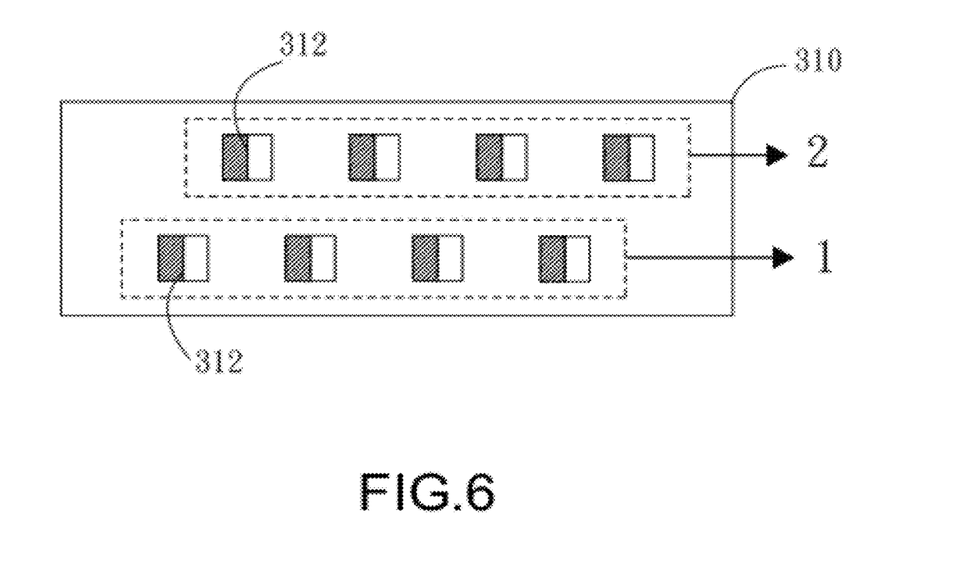
FIG. 6 shows a schematic diagram illustrating another photo sensing device according to the second embodiment of the present invention.
Figure 7:
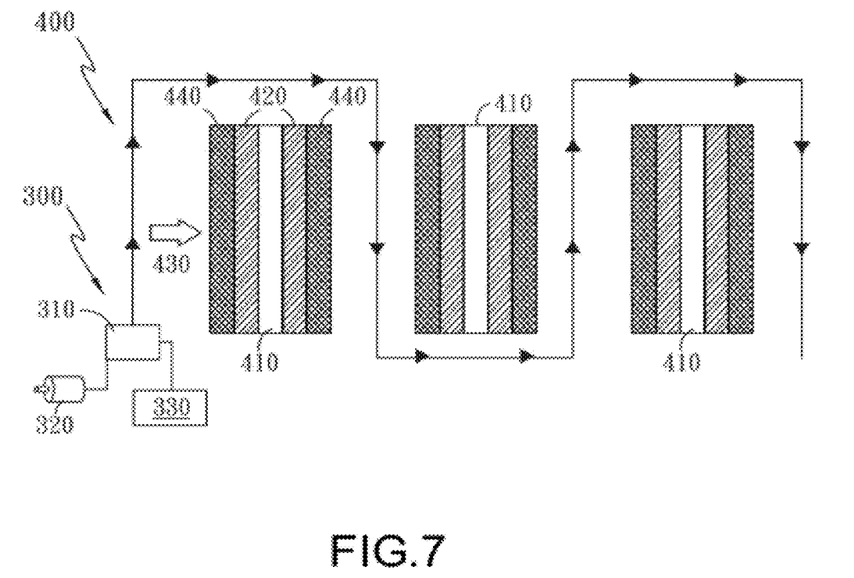
FIG. 7 shows a schematic diagram illustrating another detection and analysis apparatus for a membrane filtration process according to the second embodiment of the present invention.

As shown in FIG. 6, the photo sensing device 310 further comprises at least one second array 2. The second array is formed by a plurality of sensing elements 312 linearly arranged and the spacing between the sensing elements 312 in the photo sensing device 310 is larger than or equal to 30 mm. Preferably, the first array and the second array are parallel to each other, the sensing elements 312 in the first array and the sensing elements 112 in the second array are arranged staggered, and the spacing between the sensing elements 312 in the photo sensing device 310 is larger than or equal to 30 mm. As shown in FIG. 7, according to one example of this embodiment, the sensing elements 312 of the photo sensing device 310 are arranged double-sided to simultaneously detect the thicknesses of the cakes 440 of the adjacent filtering plates 410. Thus, the pathway that the photo sensing device 310 moves among the parallel filtering plates 410 is a continuous S shape.

Figure 8:
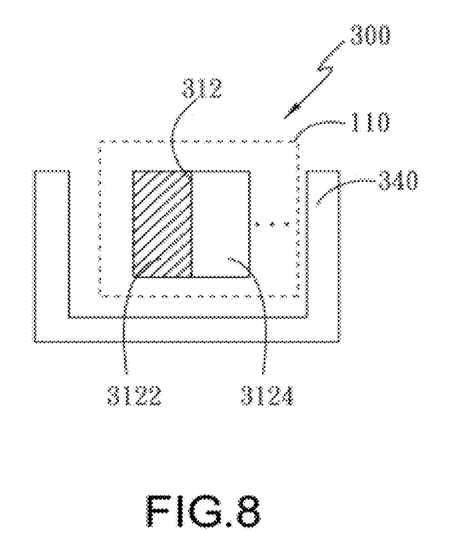
FIG. 8 shows a schematic diagram illustrating a photo sensing device provided with a protection device according to the second embodiment of the present invention.

As shown in FIG. 8, the detection and analysis apparatus 300 further comprises a protection device 340 made of PMMA covering the photo sensing device 310 to prevent the sensing elements 312 from being directly contacted with and corroded by the target fluid 430. The sensing element 312 comprises a light emitting unit 3122 and a light receiving unit 3124. The light emitting unit 3122 emits a light ray and then the light ray contacts the cake 440 and is reflected to generate a reflective ray to be received by the light receiving unit 3124. In one example, the light emitting unit 3122 is a light emitting diode (LED) while the light receiving unit 3124 is a phototransistor. The above light ray is infrared.

EXAMPLE 1

Figure 9:
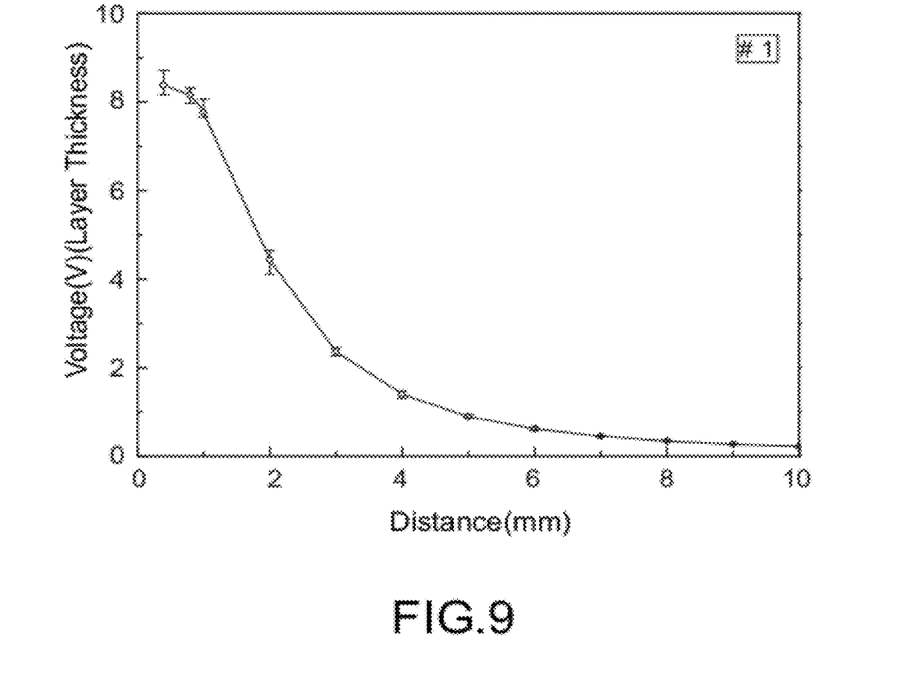
FIG. 9 is a sensor error correction diagram according to the example 1 of the present invention.

Eight sensors (called "photo sensing device" in the above embodiments) are sequentially numbered from 1 to 8. A vernier is used to adjust the height of the sensor in air to simulate the growth of the cake layer. The voltage change at different heights is recorded. After the test, the sensor is taken out and reassembled. The test is carried out for each sensor four times. Referring to FIG. 9, the test result of the sensor No. 1 is shown (the results of the other 7 sensors are similar to the sensor No. 1) and the result shows that the error is about from 5% to 10%. As the distance is within 5 mm, the slope of the sensor response curve is larger. As the distance is larger than 5 mm, the slope is too small and the sensor is not suitable for the growing cake thickness measurement. Therefore, the measurement distance between the sensor and the surface of the filter medium is preferably smaller than or equal to 5 mm.

EXAMPLE 2

Figure 10:
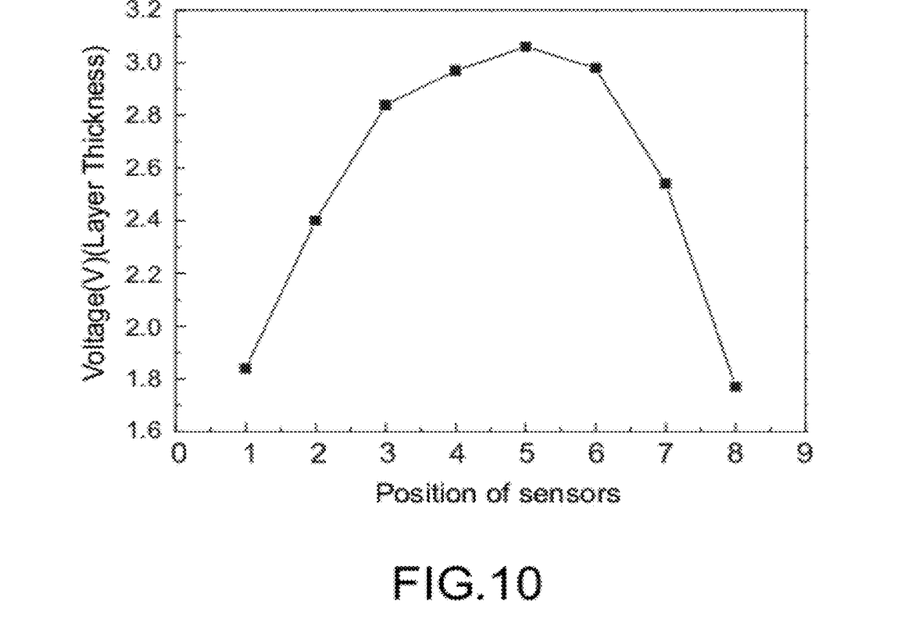
FIG. 10 is a voltage response curve illustrating the sensor signal interference test of the adjacent sensors having a spacing of 0.5 cm according to the example 2 of the present invention.

In this experiment, the operating principle of using the light reflecting element (called "sensing element") is that a light emitting diode (LED) emits an infrared light ray, the light ray is reflected by an object, and then a phototransistor receives the reflected light ray on the other end. The photocurrent generated on the two electrodes of the phototransistor has different intensity corresponding to different intensity received so that the ratio of the emitting light intensity to the receiving light intensity can be known from the measured current intensity to thereby determine the distance of the to-be-tested object. During the experiment, as the light reflecting elements are closely arranged, the phototransistors for receiving reflected light rays tend to be easily interfered by the reflected light rays emitted by the nearby elements so that the actual voltage can not be accurately detected. In order to test the interference between reflected light rays of the sensors, in the experiment, eight sensors are arranged with a spacing of 0.5 cm. The relation between the position of the sensor and the voltage interference is tested and the result is shown in FIG. 10. From the figure, the voltage change is lower for the sensors on the two sides, having lower voltage values, while the sensors positioned at the middle portion have higher voltage values. It is because the light reflecting elements positioned at the middle portion simultaneously receive the interference from the reflected light rays from the two sides to thereby have higher voltage values.

Figure 11:
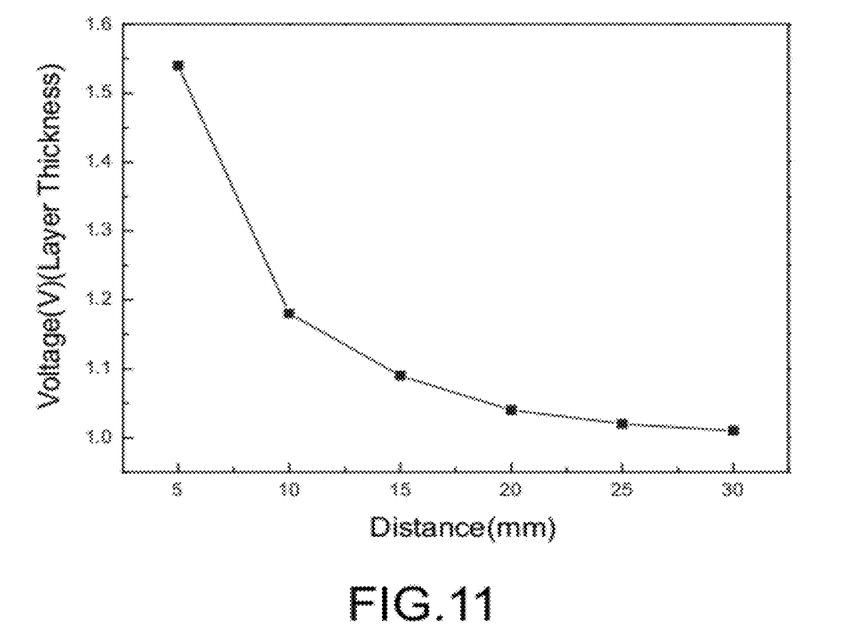
FIG. 11 is a voltage response curve illustrating the sensor signal interference test through adjusting the spacing between the adjacent sensors according to the example 2 of the present invention.

In order to further study the effect of the spacing between sensors on the measured voltage, in the experiment, the two adjacent sensors are moved and then the voltage change with change in distance is observed. The result is shown in FIG. 11. In the experiment, the initial voltage for one sensor is 1.01V but the voltage is increased to 1.54V while the spacing between the two adjacent sensors is 5 mm. This result shows the sensor is affected by the interference of the reflected light ray of the adjacent sensor. As the spacing between the two adjacent sensors is larger, the voltage value is smaller. As the two adjacent sensors are separated by 30 mm, the voltage value is back to 1.01V. From the above experiment, if multiple sensors are used in measurement, the spacing between the sensors should be kept at more than 30 mm to reduce errors due to the interference of reflected light rays.

EXAMPLE 3

Figure 12:
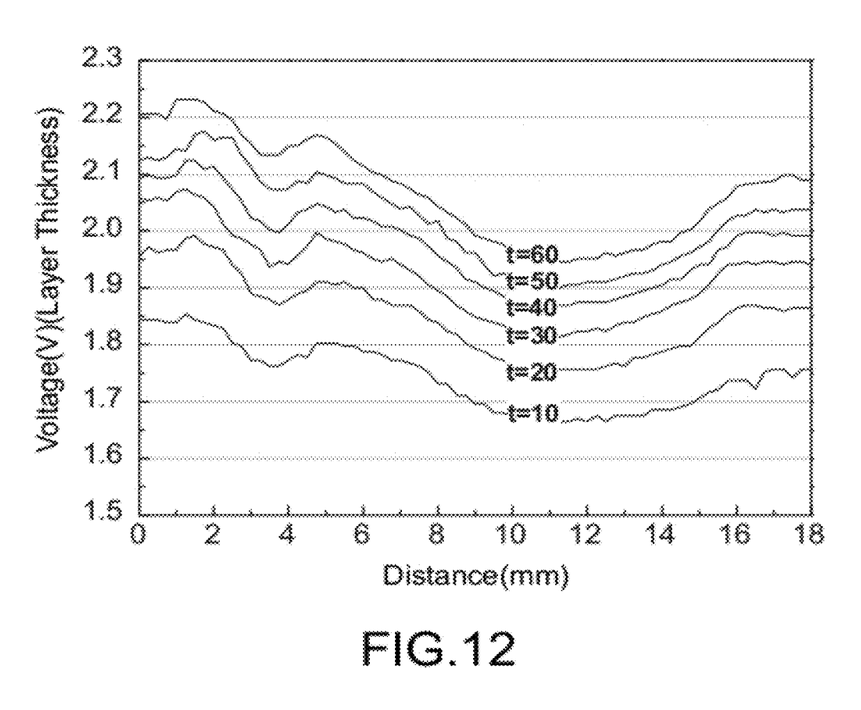
FIG. 12 is a voltage response curve illustrating the formation of the cake layer by one sensor according to the example 3 of the present invention.

One sensor is used to observe the growth of the cake layer. In the experiment, every 10 minutes, the stepping motor is controlled to move the sensor so that the sensor scans the surface of the membrane from top to bottom. This method is used to in-situ detect the growth of the cake layer in the submerged membrane bioreactor. The voltage response curve in FIG. 12 shows that the detected voltage value is higher at the position spaced from 0 cm to 2 cm. Since the suction force on the top of the frame of the plate around the air-suction inlet is stronger, a large amount of particles are deposited around the air-suction inlet. As the sensor moves downward and the suction force is decreased, the detected voltage value is gradually decreased. As the distance is around 16 cm, some particles are deposited on the side frame of the lower side due to gravitational settling so that the voltage value is slightly increased again. In the figure, the voltage change at different time is detected and the cake layer growing with increase in time is observed.

EXAMPLE 4

Figure 13:
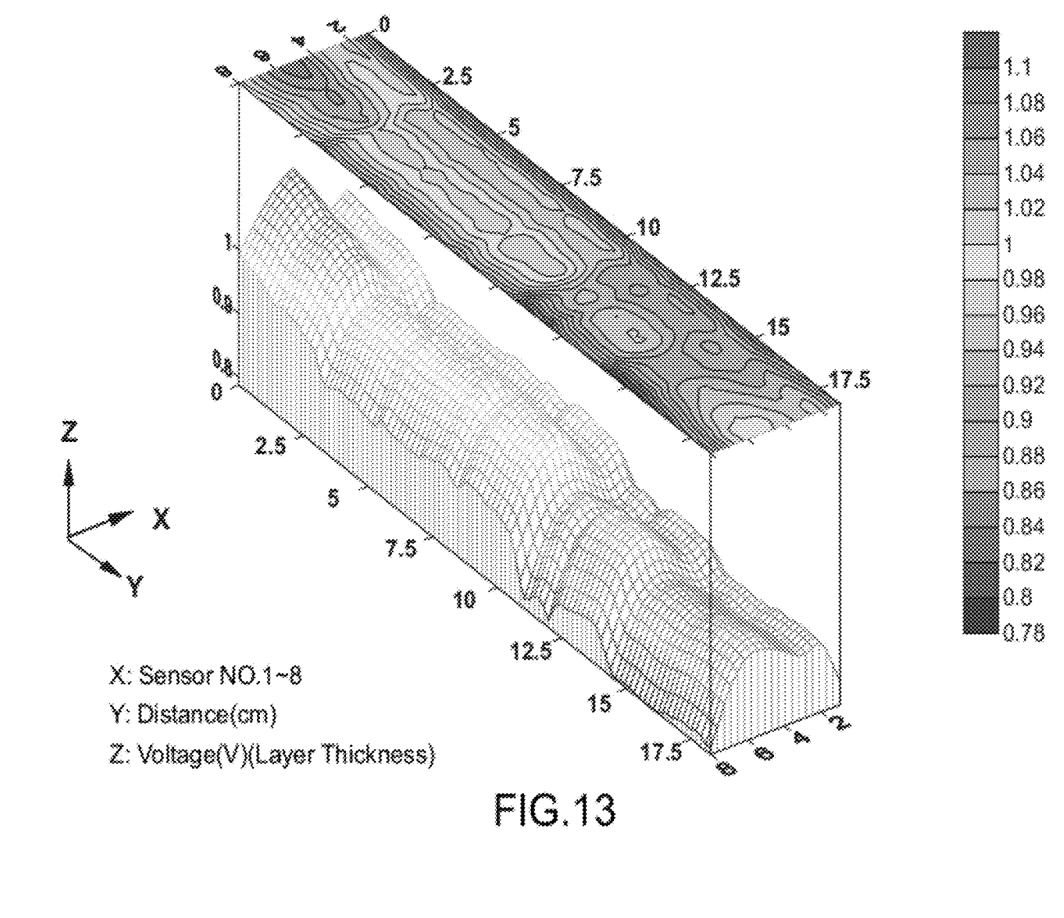
FIG. 13 is a voltage response curve illustrating the formation of the cake layer by a plurality of sensors according to the example 4 of the present invention.

The number of sensors is increased to eight. The eight sensors are used to simultaneously measure the thickness of the cake layer on the surface of the membrane. After suction and filtration perform 30 minutes, the stepping motor is controlled to move the sensors so that the sensors scan the surface of the membrane from top to bottom. Assuming the positions of the sensors are arranged on the X axis, the moving distance is on the Y axis, and the voltage value is on the Z axis, the detected data is converted to a 3D distribution diagram, shown in FIG. 13. From the figure, the voltage value on the top of the frame of the plate around the air-suction inlet is larger, indicating that the thickness of the cake layer formed in the area is thicker. As the position is lower, the suction force is smaller and the voltage value is also decreased. As the distance is around 17 cm, some particles are deposited on the side frame of the lower side due to gravitational settling so that the voltage value is slightly increased again. The result of this experiment shows that the data taken from the sensors scanning the surface of the membrane is converted into the 3D distribution diagram and thus the distribution of the cake layer can be clearly extensively observed.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A detection and analysis apparatus for a membrane filtration process, used in a filtration system comprising a filtering device, a filter medium, and a target fluid where the filtering device executes a filtration process and the filter medium possesses a thickness change of the cake formed thereon, the apparatus comprising:
    a photo sensing device, comprising a plurality of sensing elements linearly arranged to form a first array, for detecting a signal of the thickness change of the cake at a linear position of the filter medium;
    a driving device, comprising a stepping motor, for driving the photo sensing device to move relatively parallel to the filter medium on the top of the cake so that the photo sensing device detects the thickness change of the cake on at least one local plane of the filter medium; and
    a data processing device, coupling to the photo sensing device, for continuously processing and analyzing the signal detected by the photo sensing device to thereby in-situ estimate the thickness change of the cake on the at least one local plane of the filter medium during the filtration process.

2. The apparatus according to claim 1, wherein the photo sensing device further comprises at least one second array, the second array is formed by a plurality of sensing elements linearly arranged, the first array and the second array are parallel to each other, and the sensing elements in the first array and the sensing elements in the second array are arranged staggered.

3. The apparatus according to claim 1, wherein the spacing between two sensing elements in the photo sensing device is larger than or equal to 30 mm.

4. The apparatus according to claim 1, wherein the detection distance between the photo sensing device and the filter medium is smaller than or equal to 5 mm.

5. The apparatus according to claim 1, wherein the photo sensing element comprises a light emitting unit and a light receiving unit, the light emitting unit emits a light ray and then the light ray contacts the cake and is reflected to generate a reflective ray to be received by the light receiving unit.

6. The apparatus according to claim 5, wherein the light emitting unit is a light emitting diode and the light receiving unit is a phototransistor.

7. The apparatus according to claim 5, wherein the light ray is an infrared ray.

8. The apparatus according to claim 1, wherein the photo sensing device uses a digital/analog converter (AD/DA converter) to convert the signal into the data to be analyzed by the data processing device.

9. A detection and analysis apparatus for a membrane filtration process, used in a membrane bioreactor comprising a plurality of filtering plates parallel to each other and a target fluid where each filtering plate is wrapped with a filtration membrane, the membrane bioreactor executes a filtration process, and each filtration membrane possesses a thickness change of the cake formed thereon, the apparatus comprising:

a photo sensing device, comprising a plurality of sensing elements linearly arranged to form a first array, for detecting a signal of the thickness change of the cake on the filtration membrane;

a driving device, comprising a stepping motor, for driving the photo sensing device to move relatively parallel to the filtration membrane on the top of the cake and driving the photo sensing device to move among the parallel filtering plates; and a data processing device, coupling to the photo sensing device, for continuously processing and analyzing the signal detected by the photo sensing device to thereby in-situ estimate the thickness change of the cake on the entire plane of the filtration membrane of at least one filtering plate during the filtration process.

10. The apparatus according to claim 9, wherein the photo sensing device further comprises at least one second array, the second array is formed by a plurality of sensing elements linearly arranged, the first array and the second array are parallel to each other, and the sensing elements in the first array and the sensing elements in the second array are arranged staggered.

11. The apparatus according to claim 9, wherein the spacing between two sensing elements in the photo sensing device is larger than or equal to 30 mm.

12. The apparatus according to claim 9, wherein the sensing elements of the photo sensing device are arranged double-sided to simultaneously detect the thicknesses of the cakes of the adjacent filtering plates.

13. The apparatus according to claim 9, wherein the pathway that the photo sensing device moves among the parallel filtering plates is a continuous S shape.

14. The apparatus according to claim 9, wherein the detection distance between the photo sensing device and the filtration membrane is smaller than or equal to 5 mm.

15. The apparatus according to claim 9, wherein the photo sensing element comprises a light emitting unit and a light receiving unit, the light emitting unit emits a light ray and then the light ray contacts the cake and is reflected to generate a reflective ray to be received by the light receiving unit.

16. The apparatus according to claim 15, wherein the light emitting unit is a light emitting diode and the light receiving unit is a phototransistor.

17. The apparatus according to claim 15, wherein the light ray is an infrared ray.

18. The apparatus according to claim 9, wherein the photo sensing device uses a digital/analog converter (AD/DA converter) to convert the signal into the data to be analyzed by the data processing device.

* * * * *